Dec. 17, 1957  T. P. DUSENBURY ET AL  2,816,756
CHECK SHINGLING MACHINE
Filed Jan. 4, 1954  7 Sheets-Sheet 1

THEODORE P. DUSENBURY
CHARLES G. WARREN
INVENTORS

BY
ATTORNEYS

THEODORE P. DUSENBURY
CHARLES G. WARREN
INVENTORS

BY Lyon & Lyon
ATTORNEYS

THEODORE P. DUSENBURY
CHARLES G. WARREN
INVENTORS

BY Lyon & Lyon

ATTORNEYS

Dec. 17, 1957  T. P. DUSENBURY ET AL  2,816,756
CHECK SHINGLING MACHINE
Filed Jan. 4, 1954  7 Sheets-Sheet 7
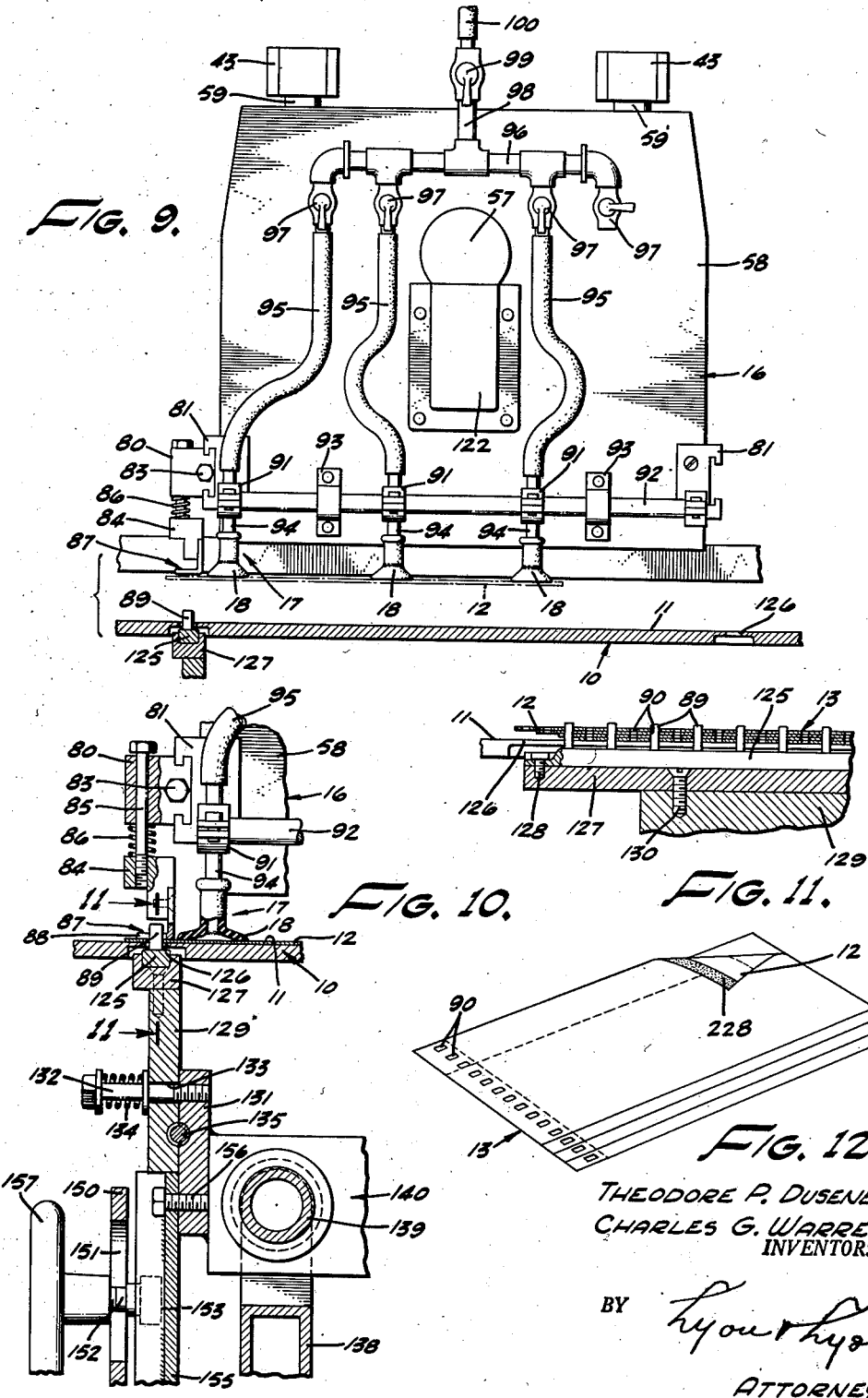
THEODORE P. DUSENBURY
CHARLES G. WARREN
INVENTORS
BY
ATTORNEYS

United States Patent Office 2,816,756
Patented Dec. 17, 1957

2,816,756

CHECK SHINGLING MACHINE

Theodore P. Dusenbury, Los Angeles, and Charles G. Warren, South Gate, Calif., assignors, by mesne assignments, to Burroughs Corporation, Detroit, Mich., a corporation of Michigan Application January 4, 1954, Serial No. 402,066

11 Claims. (Cl. 270—58)

This invention relates to improvements in sheet handling and stacking apparatus and is particularly directed to improved apparatus for making shingled strips. Apparatus of the same general type is shown and described in the co-pending application of Dusenbury et al. Serial No. 249,884, filed October 5, 1951 and entitled, Method and Apparatus for Making Shingled Strips.

It is the principal object of this invention to provide an improved form of machine for making the same type of shingled strips.

Another object is to provide a machine of this type having a minimum number of parts which are raised and lowered each time a sheet is taken from the stack and added to the shingled strip assembly.

Another object is to provide a sheet shingling apparatus particularly adapted for shingling bank checks and the like.

A more detailed object is to provide mechanism for controlling the application of suction pressure and positive pressure to the sheet gripping elements.

Other and related objects and advantages will appear hereinafter.

In the drawings:

Figure 9 is a front view partly broken away and partly in section showing the action of the suction grippers in supporting a sheet to be shingled.

Figure 10 is a fragmentary sectional elevation taken substantially on the lines 10—10 as shown in Figure 2.

Figure 11 is a sectional detail taken substantially on the lines 11—11 as shown in Figure 10.

Figure 12 is a perspective view of a completed shingled strip.

Figure 13 is a sectional elevation in diagrammatic form taken substantially on the lines 13—13 as shown in Figure 2.

Figure 14 is a sectional elevation in diagrammatic form taken substantially on the lines 14—14 as shown in Figure 2.

In the drawings:

Figure 1:
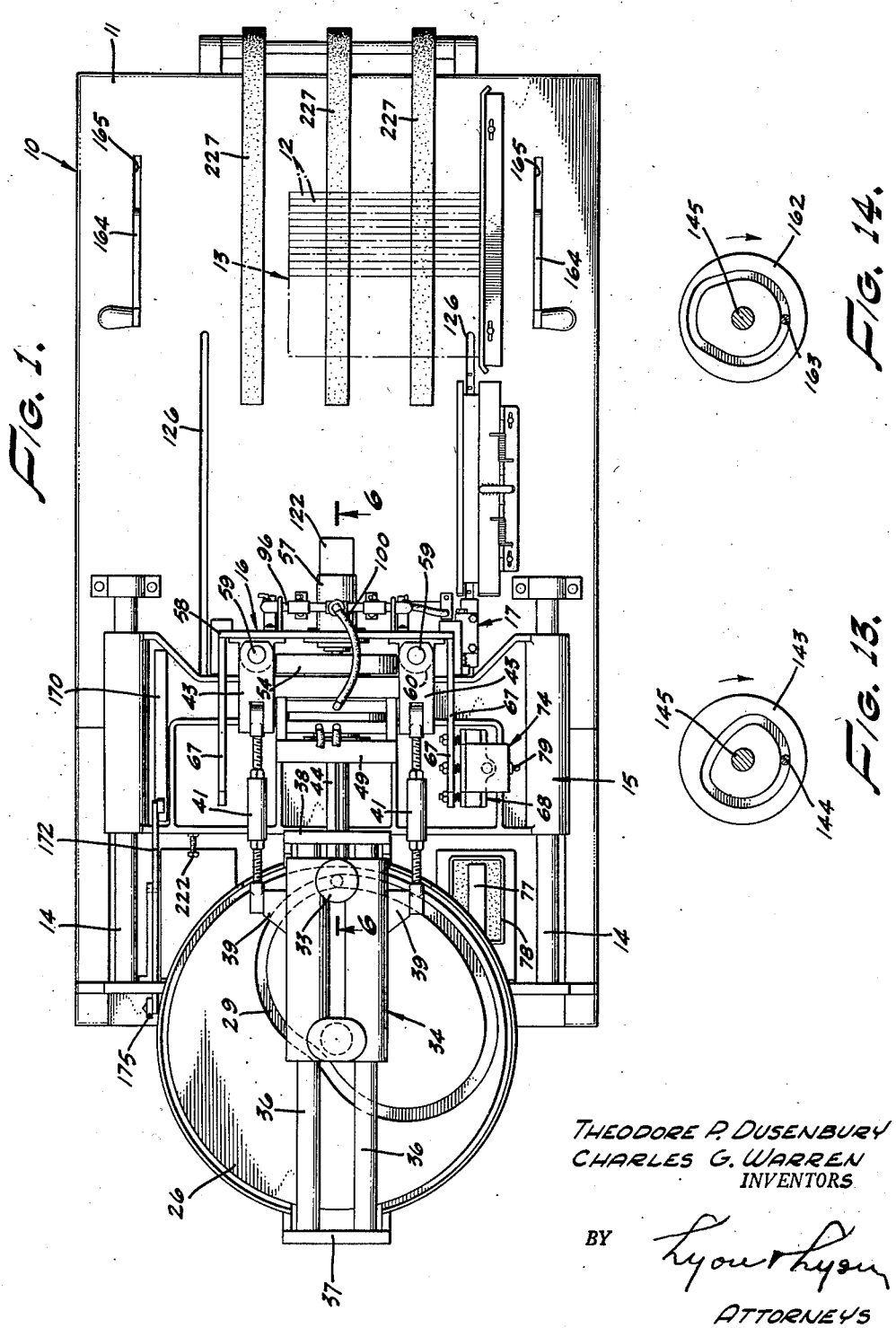
Figure 1 is a plan view showing a preferred embodiment of our invention.

The stationary frame generally designated 10 is provided with a table surface 11 on which individual sheets 12 are deposited to form shingled strips 13. The shingled strip 13 comprises a group of duplicate sheets 12 arranged in overlapping relationship so that the side edges of the individual sheets are in registry and so that the top and bottom edges of each sheet are spaced with respect to adjacent sheets. A shingled strip 13 having only four sheets is shown in Figure 12. When the individual sheets take the form of bank checks or the like, it is customary to assemble twenty-five sheets in the group.

Stationary horizontal guide bars 14 are mounted on the frame 10 and a cross-head 15 reciprocates on these guide bars. A transfer member 16 is guided for vertical movement on the cross-head 15 and this transfer member carries sheet gripping devices generally designated 17. These devices conveniently take the form of suction cups 18.

In the general plan of operation the cross-head 15 reciprocates horizontally while the transfer member 16 reciprocates vertically. The motions are timed or interrelated so that the sheet gripping devices 17 on the transfer member 16 transfer individual sheets 12 from the stack 19 and deposit them in sequence on the table surface 11. Spots of glue or other adhesive means are applied to the individual sheets, as described hereinafter, so that the sheets 12 in the shingled strip 13 are each secured to the other sheets. Mechanism is provided for advancing the shingled strip by increments so that each new sheet 12 is placed on the sheet previously deposited, with its top and bottom edges spaced from corresponding edges of the other sheets.

Proceeding to a more detailed description of the parts of the apparatus shown in the drawings, a vertical drive shaft 20 is mounted in axially spaced bearings 21 and 22. The shaft 20 is driven through a right angle gear box 23 from a change speed transmission 24 and this in turn is driven from the drive motor 25. At its extreme upper end the shaft 20 carries a cam 26 which is fixed to the hub 27 by brazing or other convenient means and the hub 27 is secured to the shaft 20 by means of the key 28. The cam 26 is provided with a continuous groove 29 in its upper face. A follower 30 projects into this groove 29.

The follower 30 is formed on the end of a vertical pin 31 mounted in spaced bearings 32 at the opposed ends of a shell or housing 33. This housing 33 is fixed to a slide block assembly 34 which includes a pair of tubular elements mounted to slide on a pair of stationary parallel rods 36. The ends of these are carried by stationary brackets 37 and 38 fixed on the frame 10. Laterally projecting ears 39 are fixed on the slide block assembly 34 and these ears are provided with trunnions. (See Figures 2 and 4). Parallel links 41 which are adjustable in length are pivoted at one end to the trunnions 40 and at the other end to pins 42 carried on the brackets 43. These brackets 43 are fixed on the cross-head 15. From this description it will be understood that rotation of the vertical drive shaft 20 serves to turn the cam 26 and thereby cause the follower 30 to move back and forth as constrained by the slide block assembly 34 upon which it is mounted. The reciprocating motion of the slide block assembly 34 is communicated to the cross-head 15 by means of the parallel links 41.

A horizontal shaft 44 is mounted in bearings 45 at one end and is slidably received at its other end within a bore 46 provided on the rotary hub 47. This hub 47 is mounted in spaced bearings 48 carried on stationary plates 49 which constitute a portion of the cross-head, generally designated 15. A bevel gear 50 fixed on the vertical shaft 20 drives a similar bevel gear 51 fixed on the horizontal shaft 44. A plurality of longitudinal keyways 52 are provided in the horizontal shaft 44 and these keyways receive a plurality of keys 53 carried on one end of the rotary hub 47. From this description it will be understood that turning movement of the vertical shaft 20 serves to drive the horizontal shaft 44 and to turn the rotary hub 47. The hub 47 turns with the horizontal shaft 44 during reciprocating movement of the cross-head 15 which carries the hub 47.

The forward end of the hub 47 carries a circular cam plate 54 provided with a cam groove 55. A cam follower 56 extends into the cam groove and this follower 56 is rotatably mounted within a housing 57 carried on the plate 58. The plate 58 and housing 57 constitute parts of the transfer member 16. The mounting for the follower element 56 within the housing 57 may be substantially the same as the mounting for the cam follower 30, previously described.

A pair of laterally spaced vertical posts 59 are mounted on the cross-head 15. The upper ends of these posts are engaged by the brackets 43. Vertically spaced guides 60 are fixed to the plate 58 so that the transfer member 16 is guided for vertical sliding movement on the parallel posts 59. When the horizontal shaft 44 rotates it causes turning movement of the hub 47 and this in turn is communicated to the cam plate 54 by means of the key 61. The rotary movement of the cam plate 54 causes the transfer member 16 to reciprocate on the parallel posts 59. The shape of the cam track is such that the transfer member 16 is raised and lowered twice for each revolution of the horizontal shaft 44. The cams 26 and 54 are so related that the transfer member 16 is raised and lowered at the opposite ends of the stroke of the cross-head 15. A guard 122 is removably mounted on the plate 58 to cover the central opening 123 therein. The horizontal shaft 44 projects into this guard when the cross-head 15 is retracted to the position shown in Figure 3.

Figure 3:
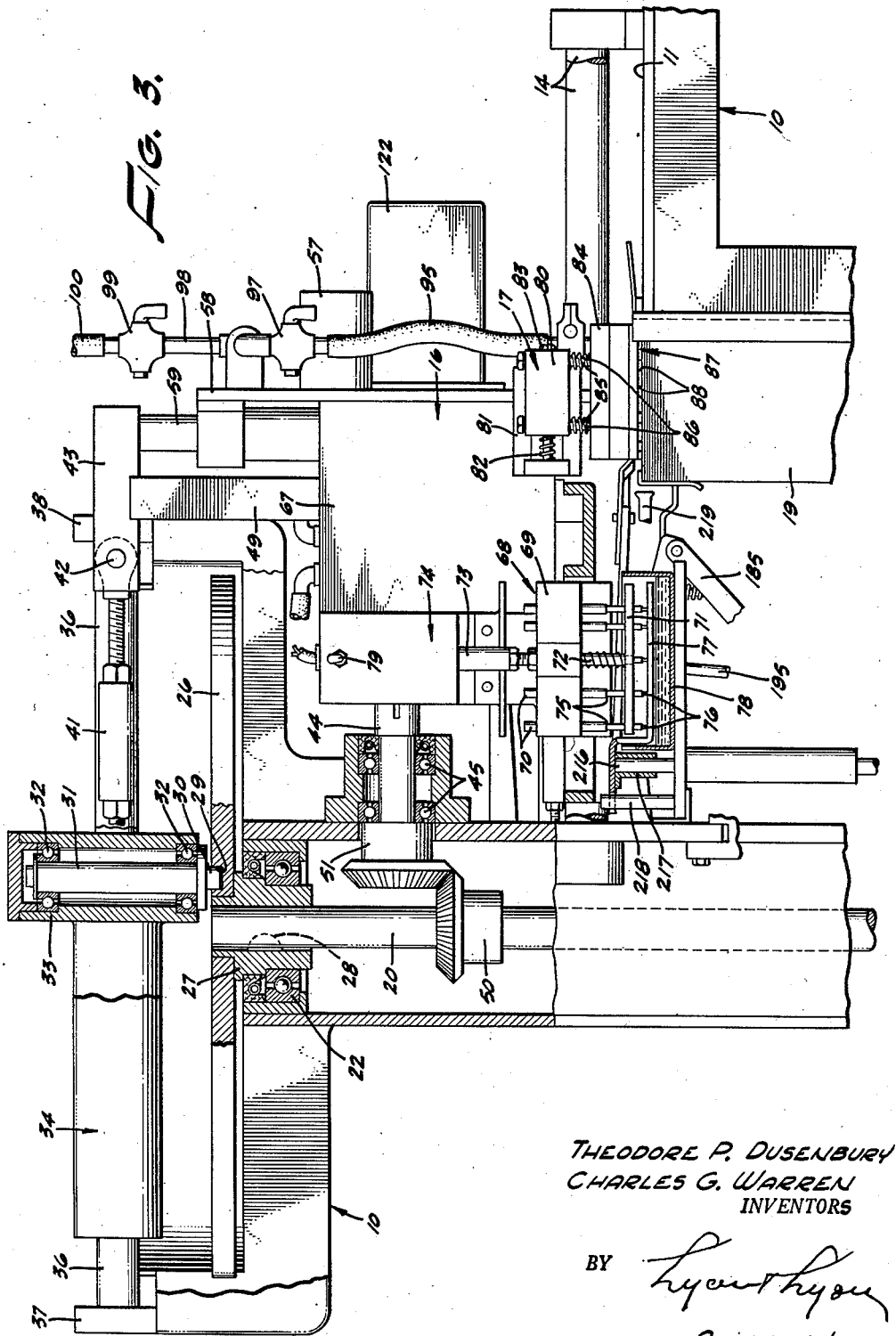
Figure 3 is a side elevation partly in section showing the carriage in the rear position.
Figure 4:
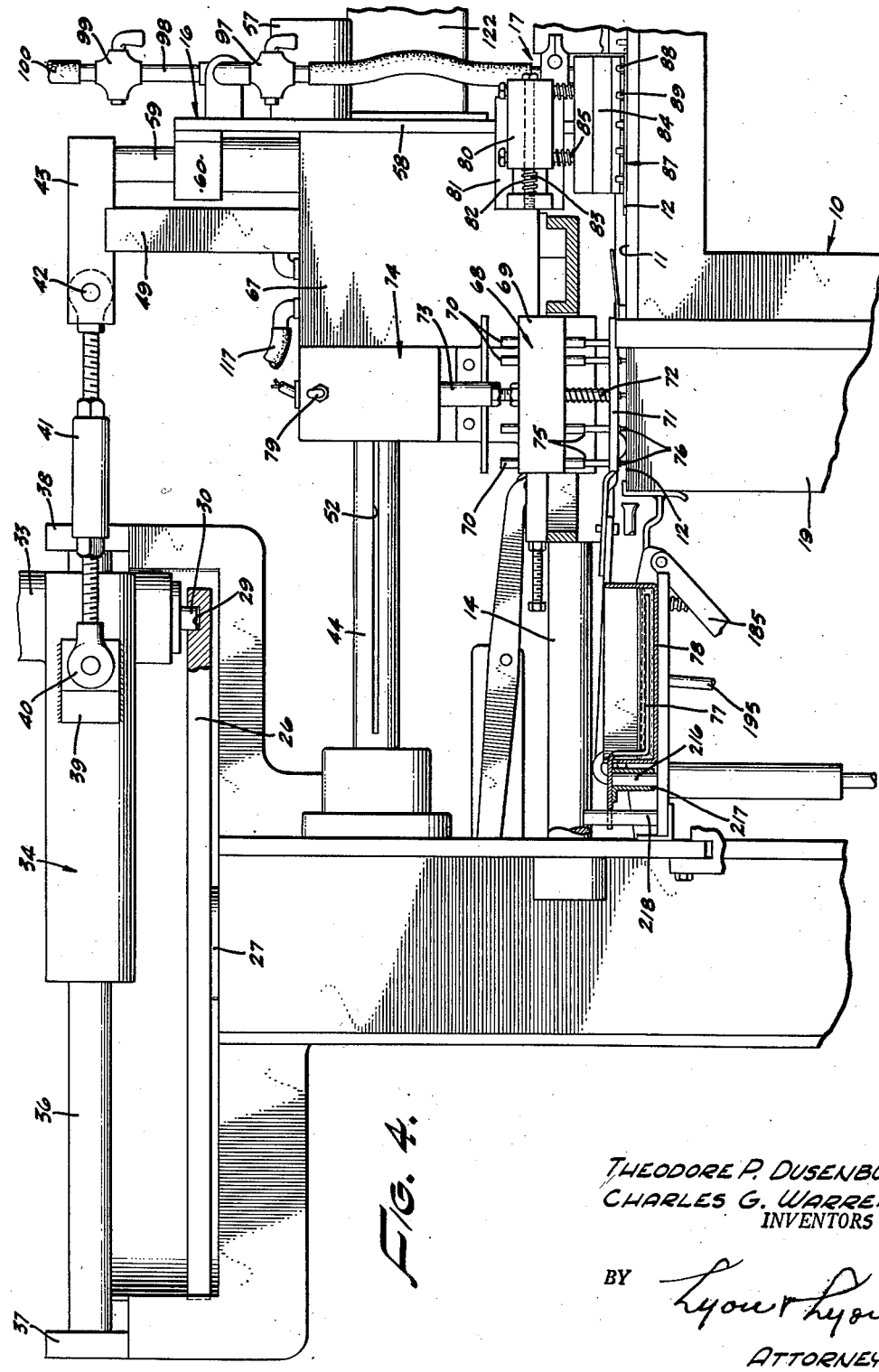
Figure 4 is a fragmentary side elevation showing the carriage in forward position.

Means are provided for supporting a stack of sheets 19 and, as shown in the drawings, this means includes a platform 62 carried on the upper end of a vertical post 63 provided with rack teeth 64. This post 63 is guided for vertical movement within a bushing 65 provided on the frame 10. A gear 66 engages the rack teeth 64 and this gear is caused to turn in a direction to elevate the post 63, in order to keep the upper end of the stack 19 at the same level. Mechanism for advancing the gear 66 step by step is described hereinafter. As best shown in Figures 3 and 4, the vertically reciprocable transfer member 16 carries side plates 67 which extend rearwardly from the plate 58. Spring mounted on each side plate 67 is a glue applicator generally designed 68. Each of these devices includes a block 69 having a plurality of vertical pins 70 slidably mounted thereon. A reduced portion of each pin 70 passes loosely through a guide plate 71. This guide plate is fixed to the lower end of a plunger 72 which slides within a suitable opening provided within the block 69. The upper end of this plunger 72 is fixed to the armature 73 of a solenoid mechanism, generally designated 74. In normal operation the pins 70 drop down until the shoulders 75 rest on the upper surface of the guide plate 71. When the block 69 is lowered with the transfer member 16 to assume the position shown in Figure 3, the lower reduced tips 76 of each of the pins 70 rest on the submersible plate 77 which is positioned within the glue receptacle 78. When the transfer member is lowered to the position shown in Figure 4, the lower tip end 76 of each of the pins 70 rests on the upper sheet 12 in the stack 19. Each tip end 76 transfers a small spot of glue to the upper surface of this sheet 12. If for any reason it is desired to interrupt the gluing operation the electric switch 79 is actuated to energize the solenoid 74. This action raises the armature 73 and lifts the guide plate 71 thereby elevating each of the pins 70 to an inoperative height.

The sheet gripping mechanism 17 which is mounted on the transfer member 16 includes the support blocks 80 which are each slidably mounted on a bracket 81. A spring 82 holds each block 80 against the head on the forward end of the horizontal rod 83. A sheet contact block 84 is carried at the lower ends of guide bolts 85. Coil springs 86 act to maintain the blocks 84 in their lowermost position. A footpiece 87 is fixed to each block 84 and this footpiece has a horizontal flange provided with spaced horizontal notches 88. These notches 88 provide clearance for guide pins 89 which extend upward through apertures 90 provided in the individual sheets 12.

The suction cups 18 which form a part of the sheet gripping mechanism are carried on brackets 91 adjustably mounted on the transverse support rod 92. This rod 92 is fixed to the forward face of the plate 58 by means of spaced brackets 93. Each suction cup 18 is connected to a short length of metal tubing 94 and this in turn is connected to a flexible hose 95. Each hose 95 is connected to a header pipe 96 by means of shutoff cocks 97. A single conduit 98 and shutoff valve 99 connects the header pipe 96 with the flexible tube 100.

Figure 8:
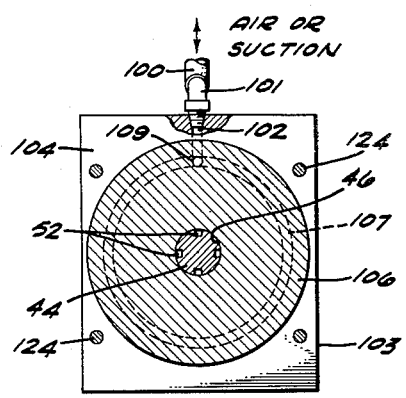
Figure 8 is a sectional detail in diagrammatic form taken substantially on the lines 8—8 as shown in Figure 6.

The flexible tube 100 is connected by means of a fitting 101 to a passage 102 formed in a stationary plate 103. (See Figures 6 and 8). The plate 103 has a side face 104 which forms a seal with the side face 105 of the flange 106 of the hub 47. A circular groove 107 in the stationary plate 103 communicates with the passage 102 through the port 108. The rotary flange 106 has an axially extending passage 109 communicating with the side surfaces 105 and 110. The stationary plate 111 has a side face 112 which bears against the face 110. An arcuate groove 113 is provided in the side face 112 and this groove communicates at one end with a port 114 and passage 115 leading to the terminal fitting 116. A suction hose 117 is connected to the fitting 116.

A second suction hose 118 is connected to the fitting 119 which communicates with the passage 120 formed in the plate 111. The passage 120 communicates with a relatively short arcuate groove 121 formed in the face 112 and placed between the ends of the relatively long arcuate groove 113. When air pressure is supplied to the hose 118 and suction pressure applied to hose 117, the arcuate groove 113 is maintained at sub-atmospheric pressure while the short groove 121 is maintained at pressure greater than atmospheric pressure. Turning movement of the flange 106 causes the passage 109 to be placed in registry with the grooves 113 and 121. Since the groove 113 is longer than the groove 121, the suction pressure is transmitted through the passage 109 for the greater part of each revolution of the horizontal shaft 44. This suction pressure is transmitted through groove 107, port 108, passage 102, and hose 100, to the sheet gripping apparatus generally designated 17. When the passage 109 is aligned with the groove 121, however, the positive pressure is suddenly transmitted through the hose 100, header 96 and suction cups 18, instantly breaking the vacuum and thereby causing the instant release of one of the sheets 12. The stationary plates 103 and 111 are clamped against the rotating flange 106 by means of rods 124 which pass through the plates.

Means are provided for advancing the pins 89 in step by step fashion relative to the table surface 11. As shown in Figure 11, the upright pins 89 are uniformly spaced on a bar 125 and project upwardly therefrom. The pins extend upward through a longitudinal slot 126 provided in the table surface. The bar 125 is fixed to a support 127 by means of screw fastenings 128 and the support 127 is in turn secured to the plate 129 by means of screw fastenings 130. The plate 129 is mounted for longitudinal sliding movement on a carrier 131. A plurality of guide bolts 132 are threadedly fixed to the support 131 and extend through horizontal slots 133 provided in the plate 129. Springs 134 serve to clamp the plate 129 against the support 131. An adjusting screw 135 is mounted between the plate 129 and support 131 and this screw 135 is provided with a hand-wheel 136 for manual manipulation. The screw 135 is mounted in spaced bearings 137 carried by the support 131.

A yoke 138 carries parallel guide rods 139 and a slide assembly 140 is arranged to reciprocate on these rods 139. The slide assembly 140 includes the carriers 131 on each side thereof. The yoke 138 is carried on the upper ends of sliding posts 141. These posts are mounted in guide bushings 142 carried on the frame 10. The posts 141 are raised and lowered by means of a cam 143 and follower 144. The cam is fixed on the horizontal cam shaft 145 which is driven from the vertical drive shaft 20 by means of a pair of bevel gears 146 and 147.

A fore and aft oscillating motion is given to the slide assembly 140 by means of a bell crank 148 which is pivoted to the frame at 149. The upright arm 150 of the bell crank 148 has a longitudinal slot 151. A stub shaft 152 projects through this slot 151 and carries a roller 153 on its inner end. The roller travels in a vertical groove 154 provided on the plate 155. This plate 155 is fixed to the carrier 131 by means of fastening elements 156. The stub shaft 156 may be clamped at any desired position along the length of the slot 151 by means of the clamping wheel 157 which is threaded to the stub shaft 152. The lateral arm 158 of the bell crank 148 is pivotally connected by means of a link 159 of adjustable length to the upper end of a sliding post 160. This post 160 is guided for vertical sliding movement by means of bushings 161 mounted on the frame. The post 160 is caused to reciprocate vertically by means of the cam 162 and follower 163. The cam 162 is fixed to the cam shaft 145.

From this description it will be understood that rotation of the cam shaft 145 serves to raise and lower posts 141 and 160 in timed sequence. The slide assembly 140, carriers 131, and plates 129, are therefore caused to reciprocate horizontally as well as to move vertically. The motion communicated to the pins 89 is such that they move upward through the table slot 126, advance forward while in their uppermost position, move downward below the level of the table surface and out of aligned perforations 90 in the shingled strip 13. The pins 89 then move to the rear and then are again raised to the position shown in Figure 11. The horizontal stroke of the pins 89 is equal to the distance between perforations 90. If it is desired to shingle sheets having a different hole spacing the horizontal stroke of the pins 89 is adjusted by raising or lowering the stub shaft 152 within the slot 151 on the bell crank arm 150.

Figure 2:
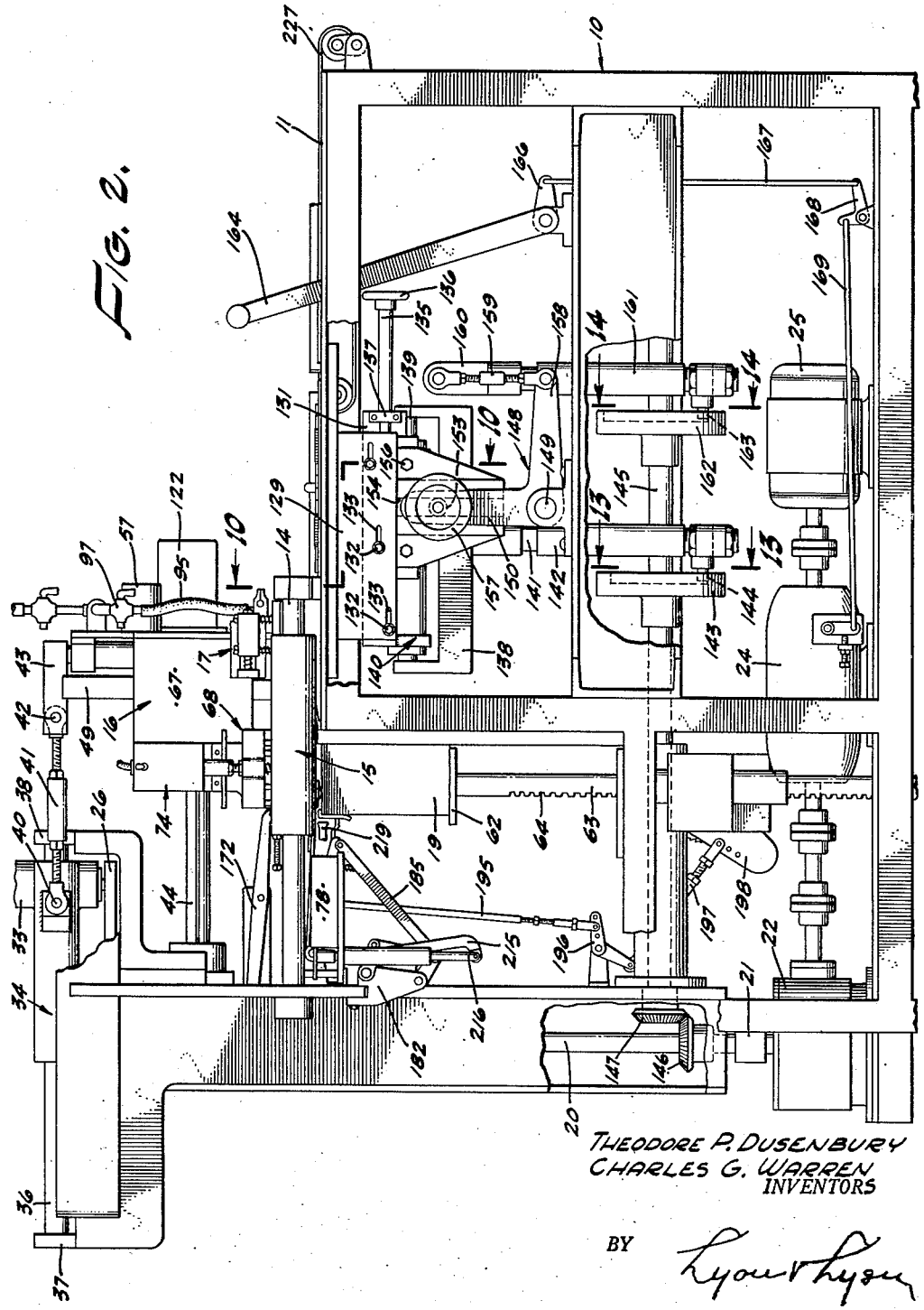
Figure 2 is a side elevation partly broken away.

The moving parts of the device all move in timed relationship and are all driven from the vertical drive shaft 20. The speed of operation is controlled by means of hand-levers 164 which project through slots 165 in the table surface 11, as shown in Figure 2. These hand-levers 164 act through linkage parts 166, 167, 168, and 169 to regulate the output speed of the transmissions 24.

Figure 5:
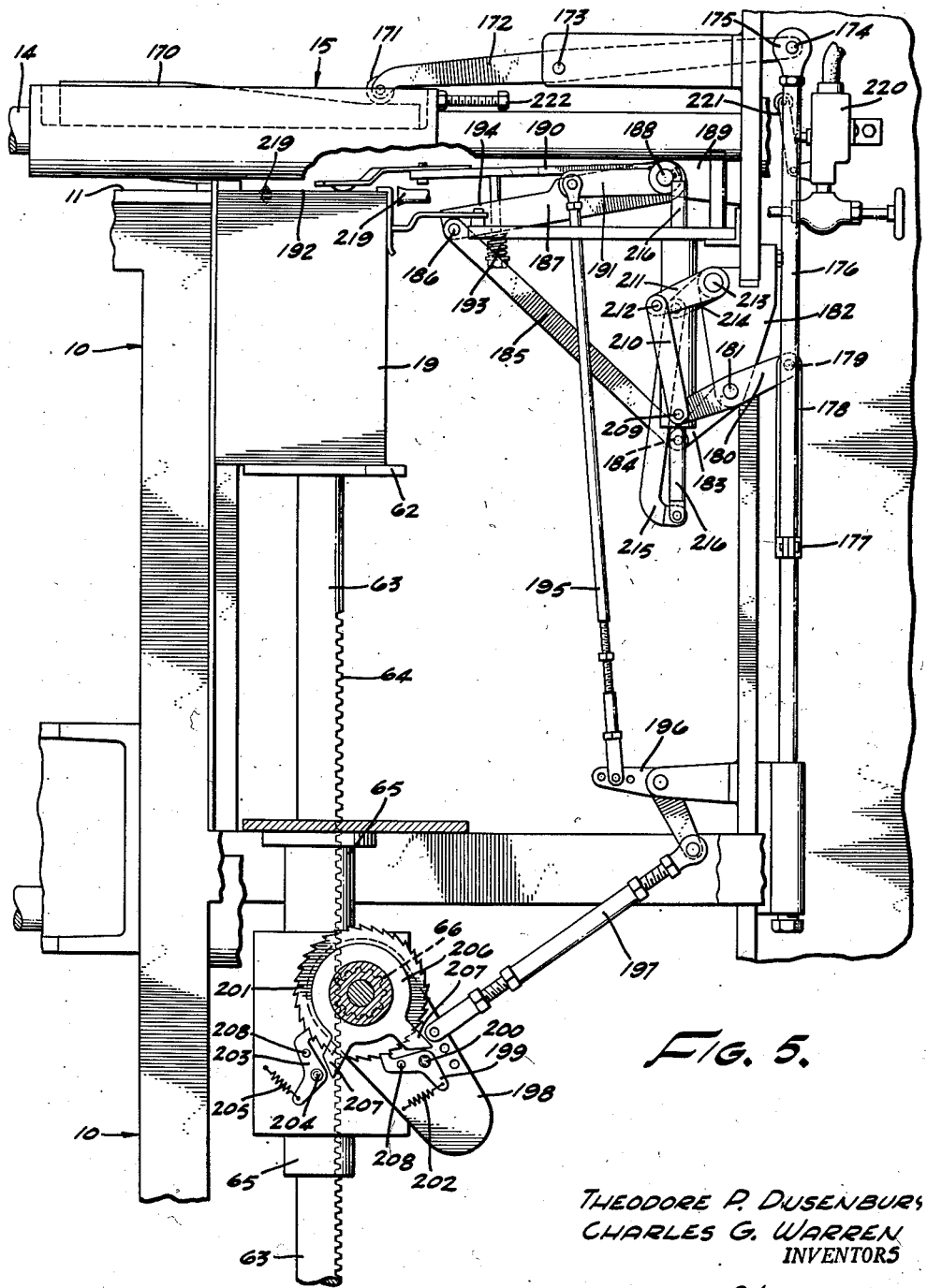
Figure 5 is a fragmentary side elevation showing mechanism for step by step raising of the stack of sheets to be shingled.

Means are provided for turning the gear 66. (See Figure 5.) These means drive the rack teeth 64 which lift the post 63. This action maintains the top of the stack 19 at the proper elevation. A cam plate 170 is fixed to the cross-head 15. A follower roller 171 rides on the surface of the cam plate 170 and this roller is carried on the forward end of a lever 172 which is pivoted to the frame at 173. The rearward end of the lever 172 is pivotally connected at 174 to the clevis 175 carried on the upper end of the rod 176. A cam 177 is adjustably clamped to the rod 176 and connected by an extension piece 178 to the pivot pin 179. The pivot pin 179 is carried on one end of a lever 180 and this lever 180 is fixed on the pivot shaft 181 carried on the stationary bracket 182.

A crank arm 183 is also fixed on the pivot shaft 181 and is connected by pin 184 to the link 185. A pin 186 connects the link 185 to the extending end of the arm 187. This arm 187 is free to turn about the pivot shaft 188 which is carried by the stationary bracket 189. The pivot shaft 188 is fixed to the finger 190 and to the crank arm 191. Swinging movement of the arm 187 is not communicated to the finger 190 nor the crank arm 191 until the level of the top 192 of the stack 19 falls below the level indicated in Figure 5. When this occurs, the finger 190 drops downward under action of the coil spring 193 and thereby permits the upper edge 194 of the arm 187 to contact the underside of the finger 190. Any movement of the finger 190 about the axis of the pivot shaft 188 is communicated through arm 191, link 195, bell crank 196, and link 197, to the ratchet crank 198. The dog 199 which is pivoted to the ratchet crank 198 at 200 engages the ratchet wheel 201 and causes it to turn clockwise. Since the ratchet wheel 201 and the spur gear 66 are connected to turn as a unit, clockwise motion of the ratchet crank 198, as viewed in Figure 5, results in elevating the post 63 and platform 62.

A spring 202 holds the ratchet dog 199 in engagement with the ratchet wheel 201 and permits counter-clockwise movement of the ratchet crank 198 without turning the ratchet wheel 201. A second dog 203 is pivoted to the stationary frame at 204 and the spring 205 acts to prevent counter-clockwise movement of the ratchet wheel 201. Both dogs 199 and 203 may be moved to an inoperative position by means of a sleeve 206 which is mounted on the hub of the ratchet wheel 201. This sleeve is provided with abutment surfaces 207 which can be engaged with pins 208 projecting from each of the dogs to cause turning movement of the dogs to inoperative position.

From the above description it will be understood that reciprocation of the cross-head 15 results in oscillation of the cam follower lever 172 about its pivot 173. This oscillating motion is reflected through linkage parts 176, 177, 178, 180, 183, 185, and 187, to cause upward movement of the finger 190 when the outer end thereof falls below a predetermined position. Upward movement of the finger 190 is reflected through linkage 191, 195, 196, 197, and 198, to cause upward movement of the post 63 and platform 62.

Means are provided for raising the submersible plate 77 within the glue receptacle 78 each time the glue carrying pins 70 are lowered into the receptacle. In this way the lower tips 76 of the glue pins 70 pick up only the small amount of glue which remains on the upper surface of the plate 77 when it is raised above the level of the glue in the receptacle 78. As shown in the drawings, the means for raising and lowering the submersible plate 77 is driven from the same oscillating lever 172 which drives the mechanism for raising the stack. The lever 180 is connected by means of pins 209 to link 210 and this link in turn is connected to arm 211 by means of pin 212. The arm 211 is fixed to pivot shaft 213 and another arm 214 is also fixed to this pivot shaft 213. A link 215 connects the arm 214 to the vertically slidable rod 216. The upper end of this rod 216 is received by a socket member 217 fixed to the submersible plate 77. A stationary pin 218 serves as a guide.

Air nozzles 219 may be mounted adjacent the upper end of the stack 19 and directed to blow air against the edges of the top sheet in the stack 19, in order to facilitate lifting of only one sheet at a time in the stack. These air nozzles 219 may be connected by suitable hose or piping to the valve 220. (See Figure 5.) An actuating lever 221 on the valve 220 is arranged to be contacted by the adjustable element 222 carried on the cross-head 15. Each time the cross-head 15 moves to the rearward end of its stroke the adjustable element 222 strikes the lever 221 to cause the valve 220 to deliver a blast of air through the nozzles 219.

In the operation of the device, a stack 19 of sheets 12 to be shingled is placed on the platform 62. The extending end of the finger 190 rests on the uppermost sheet in this stack. The speed of operation may be adjusted by means of the hand levers 164. The cross-head 15 moves to the left as viewed in Figures 1 and 2 and the carrier member 16 moves downward so that the glue pins 70 extend into the glue receptacle 78 and so that the sheet gripping mechanism 17 is positioned over the stack 19. In this first position one or more of the suction cups 18 rests on the uppermost sheet 12 in the stack 19. Suction pressure is applied to the suction cups through the header pipe 96 by way of the distributing valve arrangement 111, 106, 103. (See Figure 6.) The glue applicator mechanism and the sheet transfer mechanism are then moved to the second position, best shown in Figure 4. In this latter position the lower tips 76 of the glue pins 70 rest on the uppermost sheet 12 in the stack 19 while the suction cups deposit the previous sheet 12 on the table surface 11. As set forth above, in order to move from the first position shown in Figure 3 to the second position shown in Figure 4, the cross-head 15 is moved to the right while the transfer member 16 is first raised then lowered.

Figure 6:
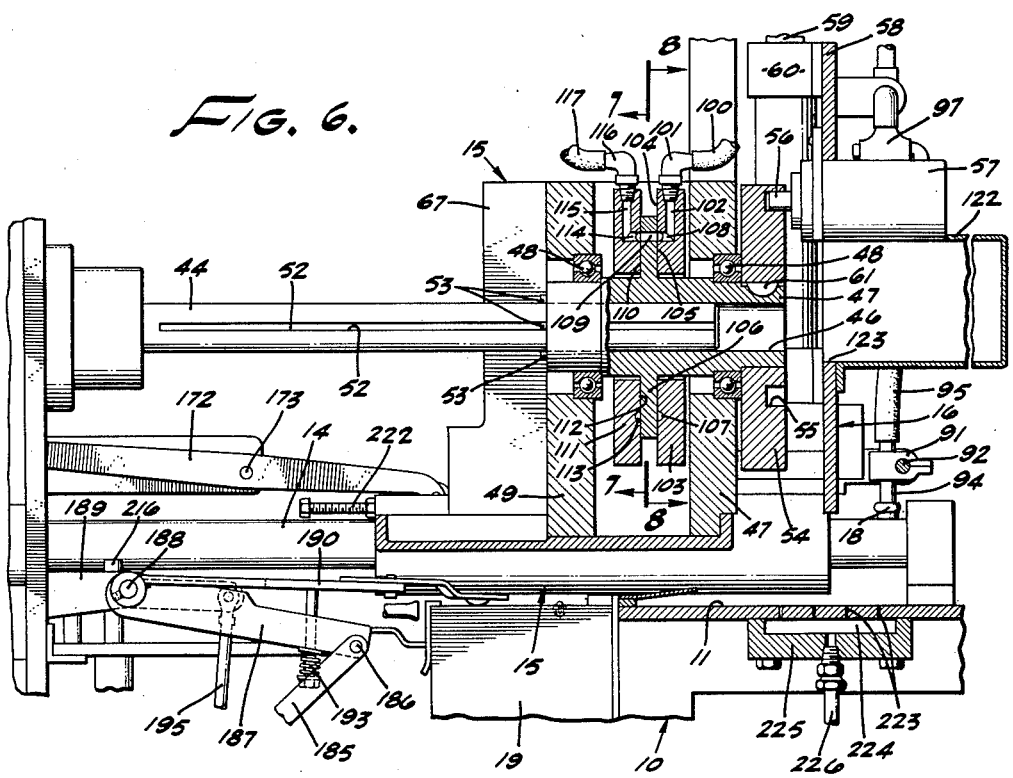
Figure 6 is a sectional elevation taken substantially on the line 6—6 as shown in Figure 1.
Figure 7:
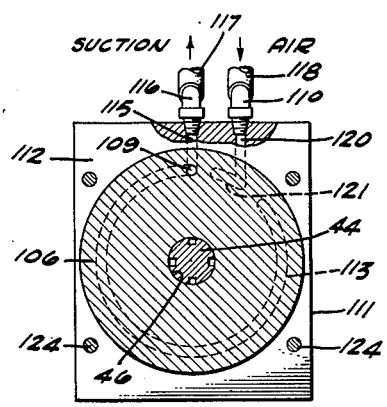
Figure 7 is a sectional detail in diagrammatic form taken substantially on the lines 7—7 as shown in Figure 6.

Suction pressure may be applied against the lower face of the sheet deposited on the table surface 11 and as best shown in Figure 6 this suction pressure may be applied by means of small passages 223 which extend from the surface 11 into communication with a chamber 224 provided by the stationary member 225. A suction line 226 maintains the chamber 224 at sub-atmospheric pressure. Release of the sheet 12 in the position as deposited on the table surface 11 is accomplished by injecting air pressure through the distributing valve parts 111, 106, 103, through the header pipe 96 and into the suction cups 18. This release is timed to occur just before the transfer member 16 is lifted to begin the return stroke.

While the cross-head 15 is returning to the first position shown in Figure 3, the pins 89 best shown in Figure 11 advance horizontally to carry the deposited sheets 12 forward in a direction away from the stack 19. The amount of movement is equal to the spacing of the perforations 90 in the individual sheets 12. The pins 89 then move downward out of the perforations 90 and are returned to their initial position. The shingled strip 13 is, therefore, advanced step by step as each successive sheet 12 is deposited upon it in overlapping relationship. Power driven belts 227 may be provided, if desired, in order to carry the completed shingled strip away from the working area on the table surface 11.

Suitable means not shown may be provided for interrupting the gluing cycle after each group of twenty-five sheets has been deposited. This separates the shingled strips 13 into separate groups. Each of the sheets 12 is preferably provided with a strip of carbon 228 along its overlapping upper edge so that anything written or typewritten along the upper edge of each sheet 12 in the shingled strip 13 is transferred to another sheet, not shown.

Having fully described our invention, it is to be understood that we do not wish to be limited to the details herein set forth, but our invention is of the full scope of the appended claims.

We claim:

1. A device for use in forming a shingled strip from a stack of sheets, comprising in combination: a frame having a table surface, a pair of laterally spaced horizontal guides fixed on said frame, a cross-head mounted to move longitudinally on said guides, a transfer member slidably mounted for vertical movement on said cross-head, a sheet gripping device mounted on the transfer member, means for reciprocating the cross-head on said guides, a horizontal shaft parallel to said guides, and means carried by said cross-head and slidable on said horizontal shaft during reciprocation of said cross-head for vertically shifting the transfer member in timed relationship with movement of the cross-head to move the transfer member from a first position in which the sheet gripping device rests on the top sheet in the stack to a second position in which the sheet gripping device deposits the said sheet on said table surface.

2. A device for forming a shingled strip from a stack of sheets, comprising in combination: a frame having a table surface, a pair of laterally spaced horizontal guides fixed on said frame, a cross-head mounted to move longitudinally on said guides, a transfer member slidably mounted for vertical movement on said cross-head, a sheet gripping device mounted on the transfer member, means for reciprocating the cross-head on said guides, a horizontal shaft parallel to said guides, means carried by said cross-head and slidable on said horizontal shaft during reciprocation of said cross-head for vertically shifting the transfer member in timed relationship with movement of the cross-head to move the transfer member from a first position in which the sheet gripping device rests on the top sheet in the stack to a second position in which the sheet gripping device deposits the said sheet on said table surface in staggered overlapping relationship to a sheet previously deposited, and means for advancing the sheets on the table surface while the transfer member is away from said second position.

3. A device for use in forming a shingled strip from a stack of sheets, comprising in combination: a frame having a table surface, a pair of laterally spaced horizontal guides fixed on said frame, a cross-head mounted to move longitudinally on said guides, a transfer member slidably mounted for vertical movement on said cross-head, a sheet gripping device and an adhesive applicator mounted on the transfer member and spaced in the direction of movement of said cross-head, means for reciprocating the cross-head on said guides, a horizontal shaft parallel to said guides, and means carried by said cross-head and slidable on said horizontal shaft during reciprocation of said cross-head for vertically shifting the transfer member in timed relationship with movement of the cross-head to move the transfer member from a first position in which the sheet gripping device rests on the top sheet in the stack to a second position in which the adhesive applicator rests on the next sheet on the top of the stack, the sheet gripping device in second position serving to deposit the first said sheet on said table surface.

4. A device for forming a shingled strip from a stack of sheets, comprising in combination: a frame having a table surface, a pair of laterally spaced horizontal guides fixed on said frame, a cross-head mounted to move longitudinally on said guides, a transfer member slidably mounted for vertical movement on said cross-head, a sheet gripping device and an adhesive applicator mounted on the transfer member and spaced in the direction of movement of said cross-head, means for reciprocating the cross-head on said guides, a horizontal shaft parallel to said guides, means driven by the cross-head reciprocating means for rotating said shaft, a cam carried by said cross-head and slidable on said horizontal shaft, said cam being driven by said horizontal shaft for vertically shifting the transfer member in timed relationship with movement of the cross-head to move the transfer member from a first position in which the sheet gripping device rests on the top sheet in the stack to a second position in which the adhesive applicator rests on the next sheet on the top of the stack, the sheet gripping device in second position serving to deposit the first said sheet on said table surface in staggered overlapping relationship to a sheet previously deposited, and means for advancing the sheets on the table surface while the transfer member is away from said second position.

5. A device for use in forming a shingled strip from a stack of sheets, comprising in combination: a frame having a table surface, a pair of laterally spaced horizontal guides fixed on said frame, a cross-head mounted to move longitudinally on said guides, a transfer member slidably mounted for vertical movement on said cross-head, a sheet gripping device including a suction cup mounted on the transfer member, means for reciprocating the cross-head on said guides, a horizontal shaft parallel to said guides, means driven by the cross-head reciprocating means for rotating said shaft, a cam carried by said cross-head and slidable on said horizontal shaft, said cam being driven by said horizontal shaft for vertically shifting the transfer member in timed relationship with movement of the cross-head to move the transfer member from a first position in which the suction cup rests on the top sheet in the stack to a second position in which the suction cup deposits the first said sheet on said table surface, means for pressurizing the suction cup in said second position, and suction means for holding the deposited sheet against the table surface.

6. A device for use in forming a shingled strip from a stack of sheets, comprising in combination: a frame having a table surface, a cross-head, means for reciprocating the cross-head horizontally over said table surface, a transfer member mounted for vertical movement on said cross-head, a horizontal shaft rotatably mounted on the frame in parallel relationship with said table surface, means for driving the horizontal shaft, a cam slidably mounted on the horizontal shaft and keyed for rotation therewith, a cam follower on the transfer member cooperating with the latter said cam for reciprocating the transfer member vertically upon rotation of said horizontal shaft, a sheet gripping device on the transfer member, and means coordinating the motion of the cross-head and transfer member to cause the transfer member to move from a first position in which the sheet gripping device rests on the top sheet of the stack to a second position in which the sheet gripping device deposits the sheet on said table surface.

7. A device for use in forming a shingled strip from a stack of sheets, comprising in combination: a frame having a table surface, a pair of laterally spaced horizontal guides fixed on said frame, a cross-head slidably mounted on said guides, means for reciprocating the cross-head on said guides, a transfer member mounted for vertical movement on said cross-head, a horizontal shaft rotatably mounted on the frame in parallel relationship with said guides, means for driving the horizontal shaft, a cam rotatably mounted on the cross-head and provided with a central opening slidably keyed to said horizontal shaft, a cam follower cooperating with the latter said cam for reciprocating the transfer member upon rotation of said horizontal shaft, a sheet gripping device on the transfer member, and means coordinating the motion of the cross-head and transfer member to cause the transfer member to move from a first position in which the sheet gripping device rests on the top sheet of the stack to a second position in which the sheet gripping device deposits the sheet on said table surface.

8. A device for forming a shingled strip from a stack of sheets, comprising in combination: a frame having a table surface, a pair of laterally spaced horizontal guides fixed on said frame, a cross-head slidably mounted on said guides, a vertical shaft rotatably mounted on the frame and having a cam fixed thereto, cam follower means cooperating with the cam to effect reciprocation of the cross-head on rotation of said vertical shaft, a transfer member mounted for vertical movement on said cross-head, a horizontal shaft rotatably mounted on the frame in parallel relationship with said guides, means for driving the horizontal shaft from said vertical shaft, a cam rotatably mounted on the cross-head and driven by the horizontal shaft, cam follower means cooperating with the latter said cam for reciprocating the transfer member upon rotation of said horizontal shaft, a sheet gripping device on the transfer member, the cams being constructed so that turning of the shafts causes the transfer member to move from a first position in which the sheet gripping device rests on the top sheet of the stack to a second position in which the sheet gripping device deposits the sheet on said table surface, and means for intermittently advancing the sheets on the table surface.

9. A device for use in forming a shingled strip from a stack of sheets, comprising in combination: a frame having a table surface, a pair of laterally spaced horizontal guides fixed on said frame, a cross-head slidably mounted on said guides, a vertical shaft rotatably mounted on the frame and having a cam fixed thereto, cam follower means cooperating with the cam to effect reciprocation of the cross-head through one complete stroke upon one complete revolution of said vertical shaft, a transfer member mounted for vertical movement on said cross-head, a horizontal shaft rotatably mounted on the frame in parallel relationship with said guides, means for driving the horizontal shaft from said vertical shaft at the same speed, a cam rotatably mounted on the cross-head and driven by the horizontal shaft, cam follower means cooperating with the latter said cam for reciprocating the transfer member through two complete strokes upon one revolution of said horizontal shaft, a sheet gripping device on the transfer member, the cams being constructed so that turning of the shafts causes the transfer member to move from a first position in which the sheet gripping device rests on the top sheet of the stack to a second position in which the sheet gripping device deposits the sheet on said table surface.

10. A device for use in forming a shingled strip from a stack of sheets, comprising in combination: a frame having a table surface, a pair of laterally spaced horizontal guides fixed on said frame, a cross-head slidably mounted on said guides, means for reciprocating the cross-head on said guides, a transfer member mounted for vertical movement on said cross-head, a horizontal shaft rotatably mounted on the frame in parallel relationship with said guides, means for driving the horizontal shaft, a cam slidably mounted on the horizontal shaft and keyed for rotation therewith, a cam follower on the transfer member cooperating with the latter said cam for reciprocating the transfer member upon rotation of said horizontal shaft, a sheet gripping device on the transfer member, means coordinating the motion of the cross-head and transfer member to cause the transfer member to move from a first position in which the sheet gripping device rests on the top sheet of the stack to a second position in which the sheet gripping device deposits the sheet on said table surface, the sheet gripping device including at least one suction cup, a suction conduit, a pressure conduit, and distributor valve means driven by said horizontal shaft for alternately connecting the suction cup to each of said conduits.

11. A device for use in forming a shingled strip from a stack of sheets, comprising in combination: a frame having a table surface, a pair of laterally spaced horizontal guides fixed on said frame, a cross-head slidably mounted on said guides, a vertical shaft rotatably mounted on the frame and having a cam fixed thereto, cam follower means cooperating with the cam to effect reciprocation of the cross-head through one complete stroke upon one complete revolution of said vertical shaft, a transfer member mounted for vertical movement on said cross-head, a horizontal shaft rotatably mounted on the frame in parallel relationship with said guides, means for driving the horizontal shaft from said vertical shaft at the same speed, a cam rotatably mounted on the cross-head and driven by the horizontal shaft, cam follower means cooperating with the latter said cam for reciprocating the transfer member through two complete strokes upon one revolution of said horizontal shaft, a sheet gripping device on the transfer member, the cams being constructed so that turning of the shafts causes the transfer member to move from a first position in which the sheet gripping device rests on the top sheet of the stack to a second position in which the sheet gripping device deposits the sheet on said table surface, the sheet gripping device including at least one suction cup, a suction conduit, a pressure conduit, and distributor valve means driven by said horizontal shaft for alternately connecting the suction cup to each of said conduits.

References Cited in the file of this patent

UNITED STATES PATENTS

| | | |
|---|---|---|
| 2,167,470 | West | July 25, 1939 |
| 2,222,983 | Marcher | Nov. 26, 1940 |
| 2,577,261 | Moser | Dec. 4, 1951 |
| 2,626,038 | Smith | Jan. 20, 1953 |